(12) United States Patent
Johnson et al.

(10) Patent No.: US 7,216,266 B2
(45) Date of Patent: May 8, 2007

(54) CHANGE REQUEST FORM ANNOTATION

(75) Inventors: Carolynn Rae Johnson, Indianapolis, IN (US); Jeffrey Loren Brentlinger, Indianapolis, IN (US); Eric Scott Roberts, Duluth, GA (US); Mark Joseph Lampe, Carmel, IN (US)

(73) Assignee: Thomson Licensing, Boulogne - Billancourt (FR)

( * ) Notice: Subject to any disclaimer, the term of this patent is extended or adjusted under 35 U.S.C. 154(b) by 460 days.

(21) Appl. No.: 10/386,767

(22) Filed: Mar. 12, 2003

(65) Prior Publication Data

US 2004/0181711 A1 Sep. 16, 2004

(51) Int. Cl.
*G06F 11/00* (2006.01)

(52) U.S. Cl. .................. 714/57; 715/512; 715/531

(58) Field of Classification Search .................. None
See application file for complete search history.

(56) References Cited

U.S. PATENT DOCUMENTS

| | | | |
|---|---|---|---|
| 5,040,142 A * | 8/1991 | Mori et al. ............... | 715/511 |
| 5,146,552 A * | 9/1992 | Cassorla et al. ........... | 715/512 |
| 5,239,466 A * | 8/1993 | Morgan et al. ............ | 715/512 |
| 5,732,219 A * | 3/1998 | Blumer et al. ............. | 709/227 |
| 6,243,722 B1 * | 6/2001 | Day et al. ................ | 715/512 |
| 6,266,683 B1 * | 7/2001 | Yehuda et al. ............. | 715/512 |
| 6,377,965 B1 | 4/2002 | Hachamovitch et al. | |
| 6,516,339 B1 * | 2/2003 | Potts et al. .............. | 709/203 |
| 6,611,275 B1 * | 8/2003 | Zey et al. ................ | 715/752 |
| 6,640,253 B2 | 10/2003 | Schaefer | |
| 6,721,921 B1 * | 4/2004 | Altman ................... | 715/512 |
| 6,918,083 B2 * | 7/2005 | Smith .................... | 715/511 |
| 6,931,592 B1 * | 8/2005 | Ramaley et al. ........... | 715/530 |
| 6,950,982 B1 * | 9/2005 | Dourish .................. | 715/512 |
| 6,950,987 B1 * | 9/2005 | Hargraves et al. ......... | 715/523 |
| 2002/0129057 A1* | 9/2002 | Spielberg ................. | 707/512 |

OTHER PUBLICATIONS

Baldonado et al. "Notable: At the intersection of annotations and handheld technology." HUC 2000, Bristol, UK, Sep. 25-27, 2000.*

* cited by examiner

*Primary Examiner*—Robert Beausoliel
*Assistant Examiner*—Philip Guyton
(74) *Attorney, Agent, or Firm*—Joseph J. Laks; Jeffrey M. Navon

(57) ABSTRACT

There is provided an error notification method for a hand-held device that is capable of syncing with a network. A change request form is generated that specifies a user-identified potential error in a document that is being displayed on the hand-held device. The change request form is transmitted to an Administrator of the document.

73 Claims, 7 Drawing Sheets

→ 500

Reader Application     8:05a

Document Title▼    📄▼    170▼

Text of currently open document.
Text of currently open document.
Text of currently open document.
Text of currently open document.
Text of currently open document.
Text of currently open document.
Text of currently open document.
Text of currently open document.
Text of currently open document.
Text of currently open document.
Text of currently open document.
Text of currently open document.
Text of currently open document.
Text of currently open document

Change Request Form    X

Use the stylus to select the text you want to file a Change Request for ...

CHANGE REQUEST FORM ANNOTATION

BACKGROUND OF THE INVENTION

1. Field of the Invention

The present invention generally relates to hand-held devices and, more particularly, to a method and apparatus that allow a user of a hand-held device to mark errors in documentation stored to the hand-held device and to submit a change request to a documentation administrator.

2. Background of the Invention

The intended end users of Commercial Etablets are in professions in which they must access particular sets of documentation to carry out their occupations. Unfortunately, such documentation may include mistakes that should be brought to the attention of a documentation administrator.

Accordingly, it would be desirable and highly advantageous to provide users of hand-held devices with the ability to mark errors in documentation and to submit a change request that specifies the errors to an administrator of the documentation.

SUMMARY OF THE INVENTION

The problems stated above, as well as other related problems of the prior art, are solved by the present invention, a method and apparatus that allow a user of a of a hand-held device to mark errors in documentation stored to the hand-held device and to submit a change request to a documentation administrator.

According to an aspect of the present invention, there is provided an error notification method for a hand-held device that is capable of syncing with a network. A change request form is generated that specifies a user-identified potential error in a document that is being displayed on the hand-held device. The change request form is transmitted to an Administrator of the document.

According to another aspect of the present invention, there is provided an error notification apparatus for a hand-held device that is capable of syncing with a network. The apparatus comprises a change request manager and a modem. The change request manager generates a change request form that specifies a user-identified potential error in a document that is being displayed on the hand-held device. The modem transmits the change request form to an Administrator of the document.

These and other aspects, features and advantages of the present invention will become apparent from the following detailed description of preferred embodiments, which is to be read in connection with the accompanying drawings.

BRIEF DESCRIPTION OF THE DRAWINGS

FIG. 5 is a screen shot of a Change Request Text Selection dialog box 500, according to an illustrative embodiment of the present invention;

FIG. 7 is a screen shot of a Change Request Form 700 with Handwriting Recognition, according to another illustrative embodiment of the present invention.

DETAILED DESCRIPTION OF THE INVENTION

The present invention is directed to a method and apparatus that allow a user of a hand-held device to mark errors in documentation stored to the hand-held device and to submit a change request to a documentation administrator. In a preferred embodiment of the present invention, one or more display structures (e.g., menus, dialog boxes, banners, and so forth) allow the user to annotate or otherwise identify one or more affected data elements (e.g., text, image, etc.), and a Change Request Form allows the user to specify the issues that must be addressed with respect to the selected data elements. The Change Request Form is stored until the hand-held device is synced to a corresponding network, at which time the Change Request Form is automatically forwarded to a documentation administrator.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
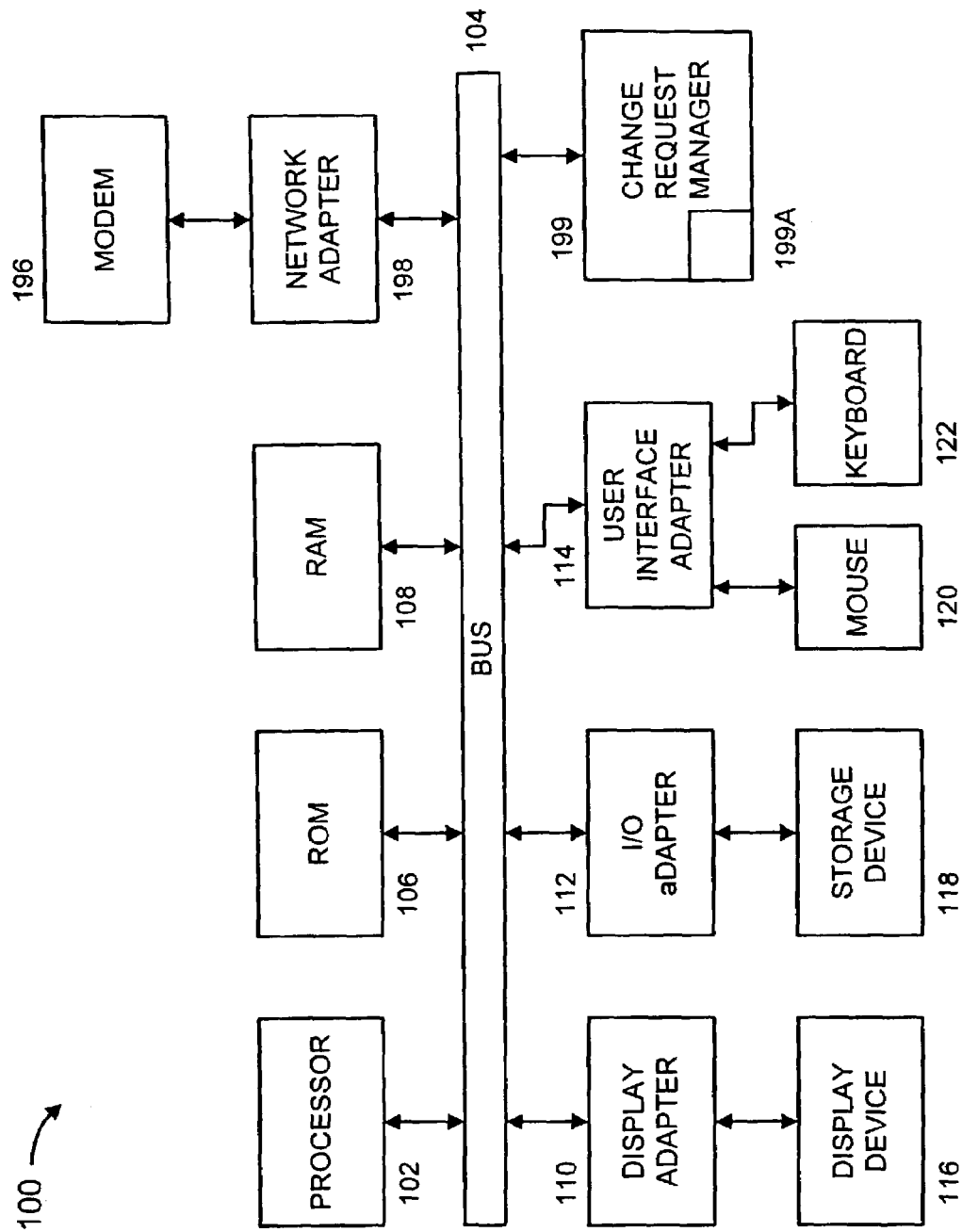
FIG. 1 is a block diagram illustrating a computer system 100 to which the present invention may be applied, according to an illustrative embodiment of the present invention.

FIG. 1 is a block diagram illustrating a computer system 100 to which the present invention may be applied, according to an illustrative embodiment of the present invention. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198 are operatively coupled to the system bus 104.

A display device 116 is operatively coupled to system bus 104 by display adapter 110. A storage device 118 (e.g., a magnetic or optical disk storage device) is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A (digital and/or analog) modem 196 is operatively coupled to system bus 104 by network adapter 198.

The computer system 100 further includes a change request manager 199.

Figure 2:
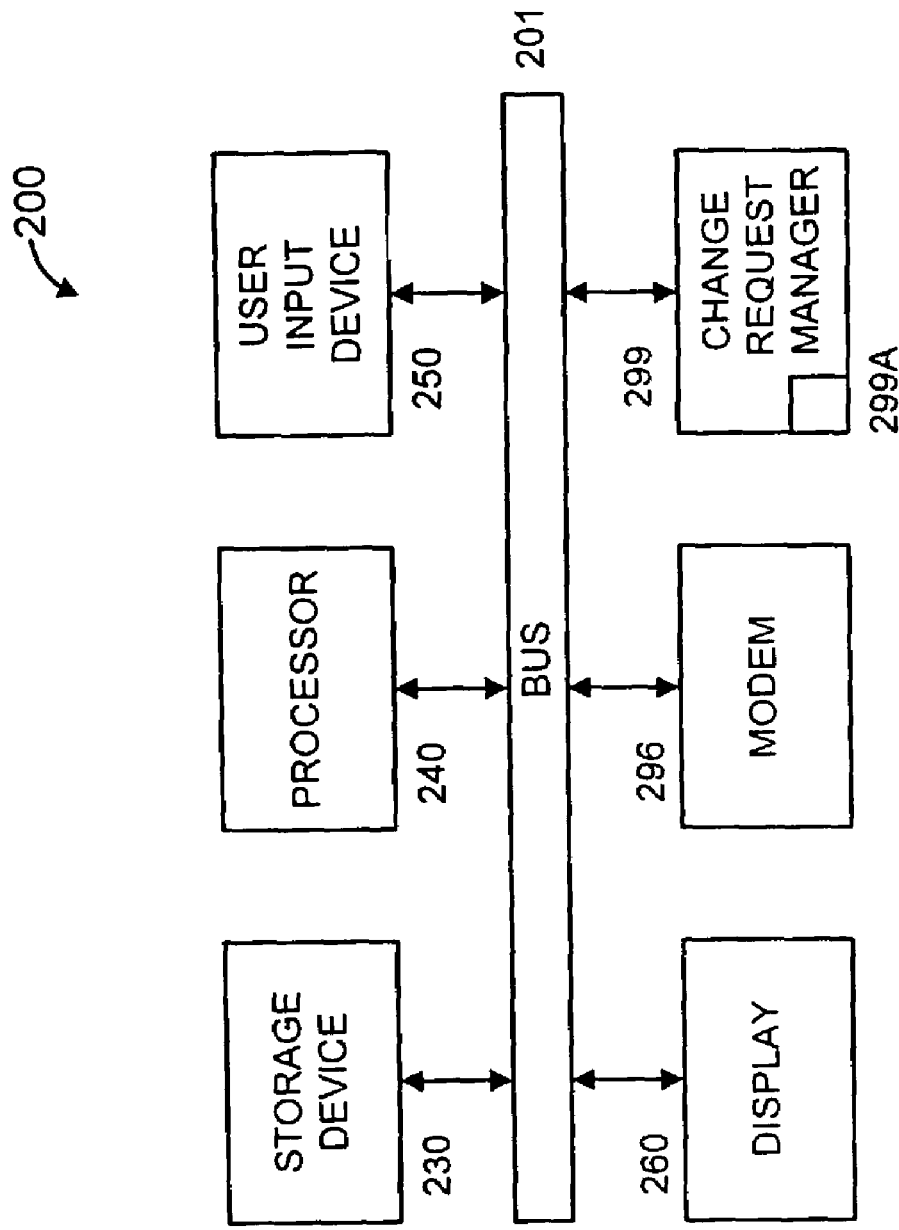
FIG. 2 is a block diagram illustrating a hand-held device 200 to which the present invention may be applied, according to an illustrative embodiment of the present invention.

FIG. 2 is a block diagram illustrating a hand-held device 200 to which the present invention may be applied, according to an illustrative embodiment of the present invention. The hand-held device 200 includes the following elements interconnected by bus 201: at least one storage device 230 (hereinafter "storage device"); at least one processor 240 (hereinafter "processor"); a user input device 250 (e.g., keyboard, keypad, touch sensitive input device, and/or remote control); a display 260; a (digital and/or analog) modem 296, and a change request manager 299. It is to be appreciated that a touch (and/or capacitance, etc.) sensitive input device may be incorporated into display 260. It is to be further appreciated that hand-held device 200 may be, for example, an Ebook, an Etablet, a Personal Digital Assistant (PDA), a cellular phone, and so forth.

The change request managers (199 and 299) manage the annotation/identification of errors and the generation of Change Request Forms that are sent to a documentation administrator. Further, the change request managers may receive, from the Administrator, Change Request Forms having comments or other information included therein by the Administrator. Such information may specify, for example, an intended and/or already taken action with respect to an error, a reason for acting upon or not acting upon an error, and so forth. As used herein, the term "error" refers to errors, omissions, inaccuracies, and so forth.

It is to be appreciated that in some embodiments of the present invention, some or all of the functions performed by the change request managers 199 and 299 may be subsumed by other elements of the computer processing system 100 and hand-held device 200, respectively. For example, processors 102 and 240 and computer programming code stored in storage devices 118 and 230, respectively may be used to implement the functions performed by the change request managers. Moreover, other elements, as readily contemplated by one of ordinary skill in the related art, may be used to implement those functions.

It is to be further appreciated that in some embodiments of the present invention (such as that shown in FIGS. 1 and 2 above and FIG. 7 below), the change request managers (199 and 299) may include handwriting recognition modules (199a and 299a, respectively) for decoding handwriting. Of course, the handwriting recognition modules need not be included in the change request managers and, thus, may be separate from but in communication with the change request managers. Further, the handwriting recognition modules may be omitted altogether. Given the teachings of the present invention provided herein, one of ordinary skill in the related art will contemplate these and various other implementations and configurations of the present invention, while maintaining the spirit and scope of the present invention.

Figure 3:
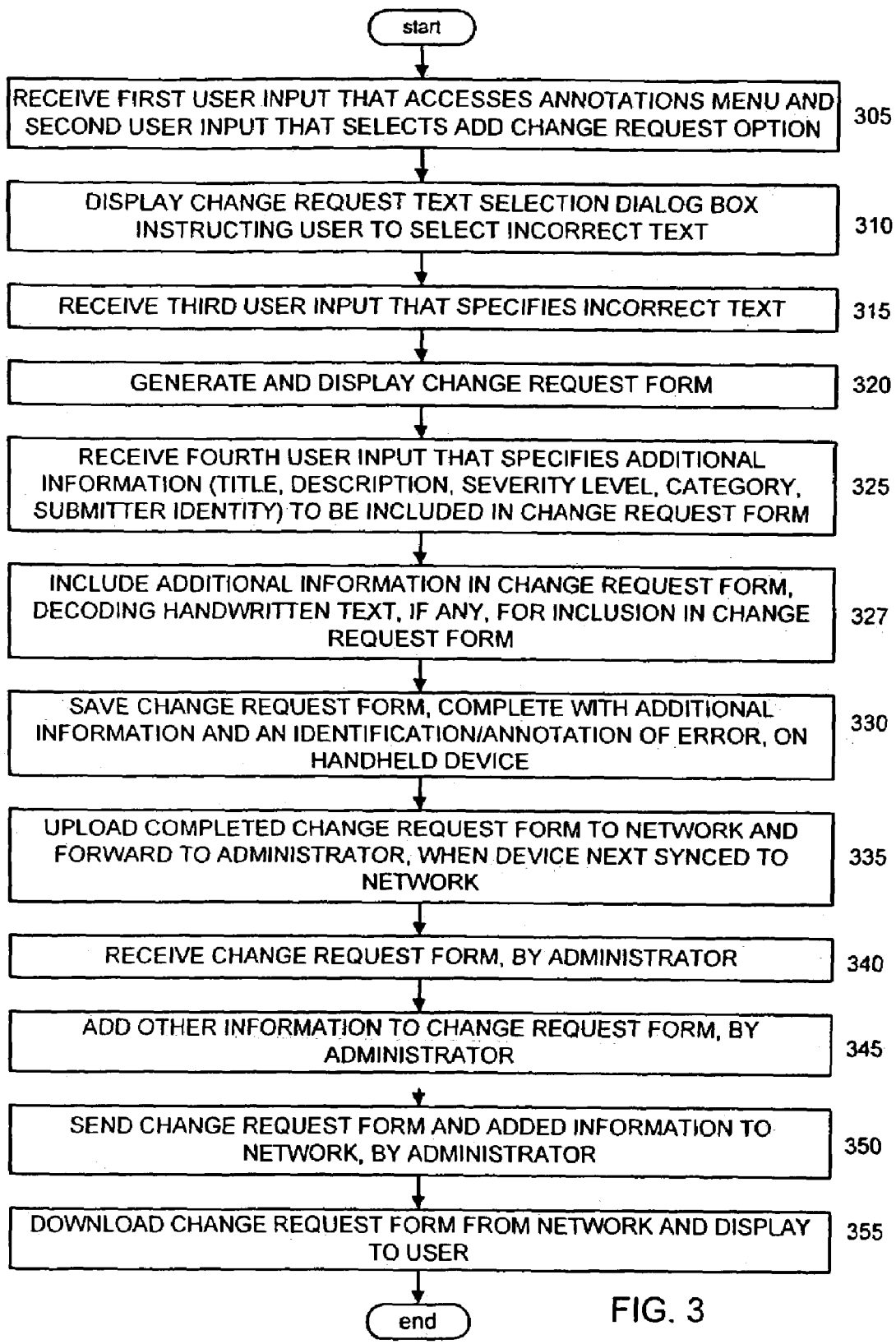
FIG. 3 is a flow diagram illustrating an error notification method for a hand-held device that is capable of synching with a network, according to an illustrative embodiment of the present invention.

FIG. 3 is a flow diagram illustrating an error notification method for a hand-held device that is capable of synching with a network, according to an illustrative embodiment of the present invention.

Figure 4:
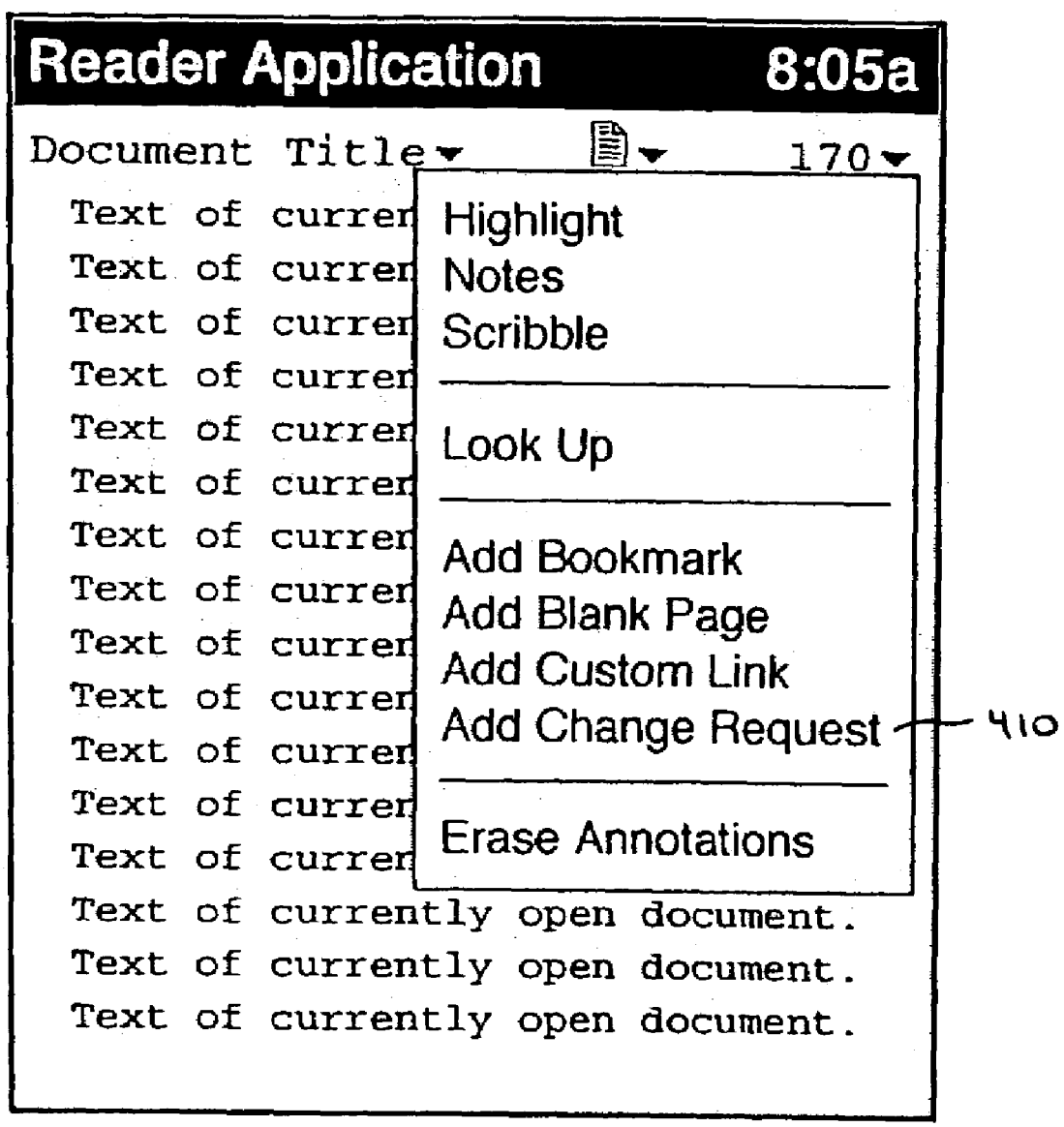
FIG. 4 is a screen shot of an Annotations Menu 400 having an Add Change Request option 410 thereon, according to an illustrative embodiment of the present invention.

Upon a user of the hand-held device encountering a potential error with respect to one or more elements of a document (e.g., text or image data that he or she believes to be incorrect, an omission of text and/or image data that is believed to be necessary or useful, and so forth), a first user input is received that accesses an Annotations Menu and a second user input is received that selects an Add Change Request option from the Annotations Menu (step 305). FIG. 4 is a screen shot of an Annotations Menu 400 having an Add Change Request option 410 thereon, according to an illustrative embodiment of the present invention.

A Change Request Text Selection dialog box is generated and displayed to the user that instructs the user to select the incorrect text that is to be the subject of a Change Request Form (step 310). FIG. 5 is a screen shot of a Change Request Text Selection dialog box 500, according to an illustrative embodiment of the present invention. A third user input is received that specifies the incorrect text (step 315).

A Change Request Form is generated and displayed to the user (step 320). Any errors already identified/annotated by the user are associated with the Change Request Form, either as part of the Change Request Form (in the description field or some other field shown or not shown) or as a separate file associated with the Change Request Form. In the latter case, an association may be made, for example, by including the name of the separate file (or some other pointer) in the Change Request Form or by any other way as readily determined by one of ordinary skill in the related art. It should be noted that while the Change Request Form is displayed to the user subsequent to the user selecting the incorrect text at step 315, the Change Request Form may be displayed to the user immediately upon the user accessing the Annotations Menu and selecting the Add Change Request option as per steps 305 and 310 above, if the user had selected the incorrect text prior to steps 305 and 310.

Figure 6:
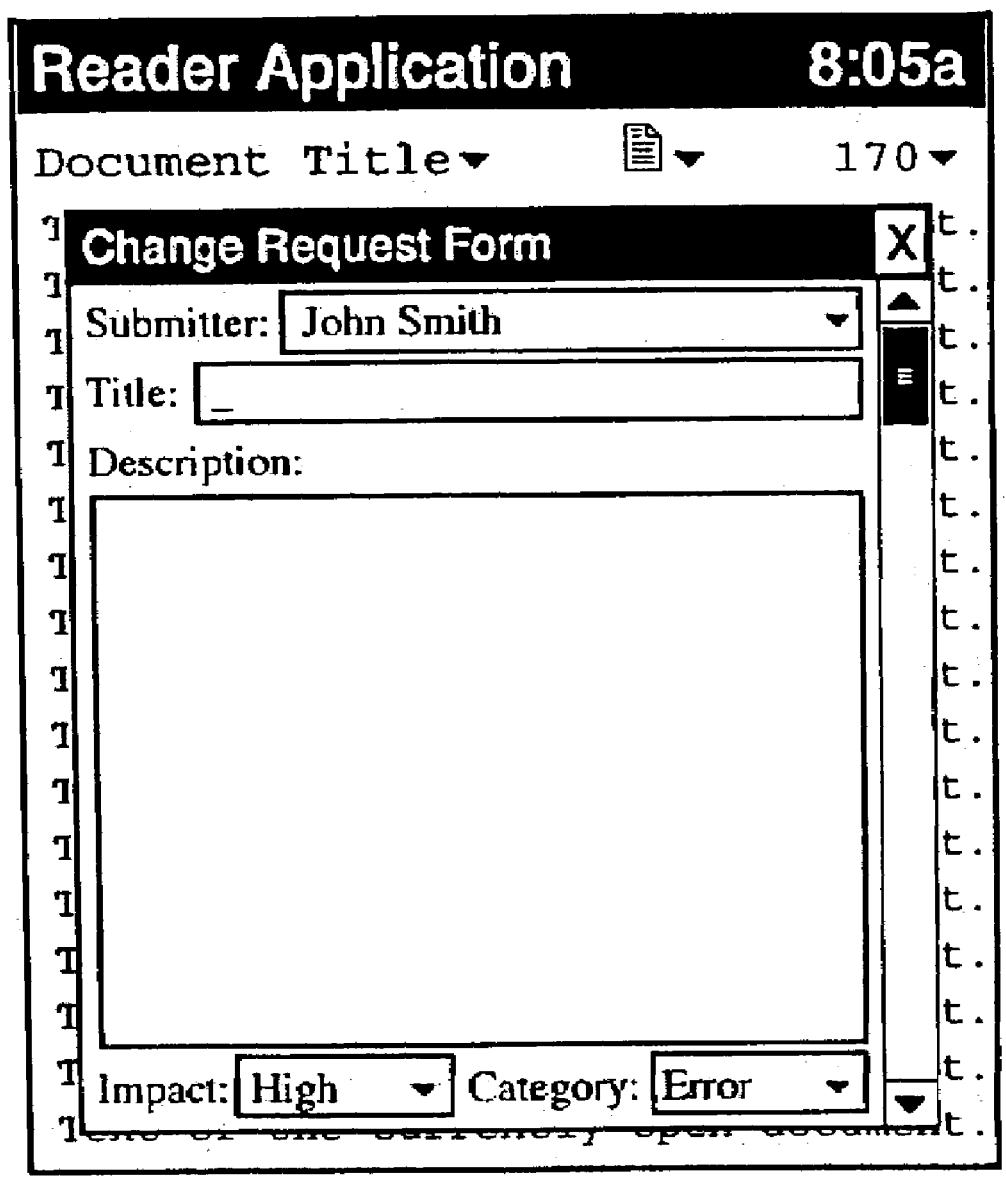
FIG. 6 is a screen shot of a Change Request Form 600, according to an illustrative embodiment of the present invention.

FIG. 6 is a screen shot of a Change Request Form 600, according to an illustrative embodiment of the present invention. The Change Request Form allows the user to specify what he or she believes to be in error regarding the selected data element(s). The example shown below allows the user to enter a title and description for the Change Request, allows the user to select an impact or severity level to categorize the error identified in the Change Request Form, and allows the user to indicate himself or herself as the submitter of the Change Request Form. Additional fields, including a Submit button would be accessible by scrolling down in the Change Request window.

It is to be appreciated that the fields depicted with respect to the illustrative method of FIG. 3 may be readily adapted to the type of client, type of documentation, documentation content, documentation format, and other considerations, as readily determined and implemented by one of ordinary skill in the related art. For example, fields may be added, deleted and/or modified depending on a particular application.

Figure 7:
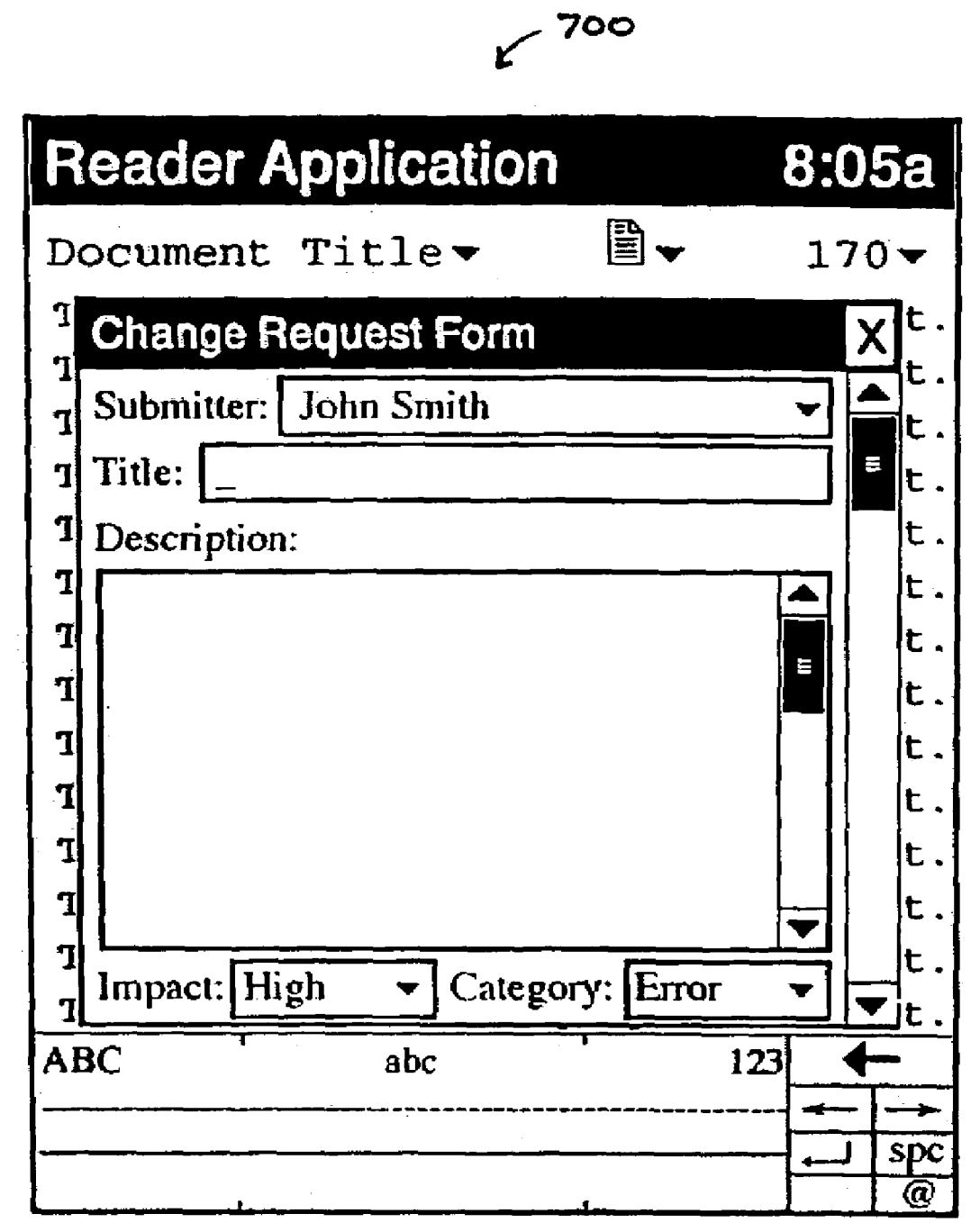

FIG. 7 is a screen shot of a Change Request Form 700 with Handwriting Recognition, according to another illustrative embodiment of the present invention. It is to be appreciated that the Change Request Form depicted in FIG. 7 allows screen space for a handwriting recognition area for the hand-held device, and provides for a scrollable description.

Optionally, a fourth user input is received that specifies any additional information to be included in the Change Request Form (step 325). As noted above, the additional information may include, for example, title for the Change Request Form and/or error, a description of the error, an impact or severity level of the error, a category, the identity of the submitter of the Change Request Form, and so forth.

The additional information specified by the fourth user input is included in the Change Request Form (step 327). In the case that the additional information, or any other information/input received from the user, is provided as handwritten text, then the handwritten text is decoded and then included in the Change Request Form. It is to be appreciated that the handwritten text may be provided, for example, by the user writing on a display with a handwriting input capability.

The Change Request Form, complete with the additional information and an identification/annotation of the error, is saved on the hand-held device (step 330). The completed Change Request Form is uploaded to the network and forwarded to an Administrator of the documentation, when the hand-held device is synced to the network (step 335). Preferably, the completed Change Request Form is uploaded the next time the hand-held device is synced to the network, but such uploading may also be performed at pre-defined times.

Optionally, the Administrator of the documentation has the capability to include other information and/or fields to the Change Request Form, such as reasons why the change request cannot be accommodated, what action has been taken or is to be taken in the future, and so forth. Thus, a Change Request Form that has been "updated " by the Administrator could then be later downloaded to the submitter's device.

Thus, upon the Administrator receiving the Change Request Form (step 340), the Administrator adds other information to the request form (e.g., reason for denial) (step 345), and sends the Change Request Form to the network along with the newly added other information for forwarding to the hand-held device (step 350).

The Change Request Form, along with the information added by the documentation administrator, is downloaded from the network by the hand-held device and is displayed to the user (step 355). Accordingly, the user can review the added information to determine the action taken/to be taken, if any, by the Administrator with respect to the error identified in the Change Request Form and/or a reason for such action (or inaction) by the Administrator.

It is to be appreciated that while the present invention is described herein with respect to menus, dialog boxes, forms, and so forth, the present invention is not limited to these display structures and, thus, other structures and the like as readily contemplated by one of ordinary skill in the related art may be employed in implementations of the present invention, while maintaining the spirit and scope of the present invention. The other structures may be, e.g., other display structures (e.g., banners, menus, dialog, boxes, etc.), hardware structures (e.g., switches, buttons, sliders, etc.), and so forth.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope, of the invention as defined by the appended claims.

What is claimed is:

1. An error notification method for a hand-held device that is capable of syncing with a network, comprising the steps of:
   generating a change request form that specifies a user-identified potential error in a document that is being displayed on the hand-held device;
   transmitting the change request form to an Administrator of the document;
   receiving information from the Administrator regarding the user-identified potential error; and
   displaying the information to the user, and
   wherein the change request form further specifies a severity level of the user-identified potential error.

2. The error notification method of claim 1, wherein the change request form further specifies at least one of a title of the user-identified potential error and a description of the user-identified potential error.

3. The error notification method of claim 1, further comprising the steps of:
   adding the information to the change request form, by the Administrator; and
   forwarding the change request form with the added information to the hand-held device, and wherein said receiving step comprises the step of receiving the information in the change request form.

4. The error notification method of claim 1, wherein said transmitting step comprises the step of automatically uploading the change request form to the network when the hand-held device is synced with the network.

5. The error notification method of claim 1, further comprising the step of displaying an annotations menu for allowing the user to annotate the document to identify the user-identified potential error.

6. The error notification method of claim 1, further comprising the step of displaying a change request text selection dialog box for allowing the user to enter text corresponding to the user-identified potential error for inclusion in the change request form.

7. The error notification method of claim 1, wherein said generating step comprises the step of displaying the change request form to the user to allow the user to specify the user-identified potential error thereon.

8. The error notification method of claim 7, wherein said generating step further comprises the steps of:
   receiving a handwritten user input on the change request form that specifies the user-identified potential error in the document;
   decoding the user input using handwriting recognition; and
   including the decoded user input in the change request form prior to said transmitting step.

9. The error notification method of claim 1, wherein said change request form specifies the user-identified potential error using a pointer to an entity other than the change request form, the entity for at least one of annotating and identifying the error, and said method further comprises the step of associating the pointer with the change request form.

10. An error notification apparatus for a hand-held device that is capable of syncing with a network, comprising:
    a change request manager for generating a change request form that specifies a user-identified potential error in a document that is being displayed on the hand-held device; and
    a modem for transmitting the change request form to an Administrator of the document, wherein the change request form further specifies a severity level of the user-identified potential error, and
wherein said chance request form specifies the user-identified potential error using a pointer to an entity other than the chance request form, the entity for at least one of annotating and identifying the error, and said pointer is associated with the change request form.

11. The error notification apparatus of claim 10, wherein the change request form further specifies at least one of a title of the user-identified potential error and a description of the user-identified potential error.

12. The error notification apparatus of claim 10, wherein the modem receives information from the Administrator regarding the user-identified potential error, and the apparatus further comprises a display for displaying the information to the user.

13. The error notification apparatus of claim 10, wherein said modem automatically uploads the change request form to the network when the hand-held device is synced with the network.

14. The error notification apparatus of claim 10, further comprising a display for displaying an annotations menu for allowing the user to annotate the document to identify the user-identified potential error.

15. The error notification apparatus of claim 10, further comprising a display for displaying a change request text selection dialog box for allowing the user to enter text corresponding to the user-identified potential error for inclusion in the change request form.

16. The error notification apparatus of claim 10, further comprising a display adapted to display the change request form to the user to allow the user to specify the user-identified potential error thereon.

17. The error notification apparatus of claim 16, wherein said display is further adapted to receive a handwritten user input on the change request form that specifies the user-identified potential error in the document, said method further comprises a handwriting recognition module for decoding the user input, and wherein said change request manager includes the decoded user input in the change request form prior to the change request form being transmitted by said modem.

18. The error notification method of claim 1, further comprising the steps of:
displaying the document, from within a software application, for viewing by a user; and
providing, by the software application while displaying the document, a mechanism allowing the user to request the change request form,
wherein generating the change request form comprises generating the change request form in response to the user using the mechanism to request the change request form.

19. A program storage device having an application program tangibly embodied thereon, the application program including instructions for performing at least the following:
providing a change request form that allows a user to specify a potential error in a document that is being displayed on a hand-held device; and
sending the change request form to an administrator of the document,
wherein said change request form specifies the user-identified potential error using a pointer to an entity other than the change request form, the entity for at least one of annotating and identifying the error, and said pointer is associated with the chance request form.

20. The program storage device of claim 19, wherein the change request form further specifies at least one of a title of the user-identified potential error and a description of the user-identified potential error.

21. The program storage device of claim 19, wherein the application program further includes instructions for performing at least the following:
receiving information from the Administrator regarding the user-identified potential error; and
displaying the information to the user.

22. The program storage device of claim 21, wherein the application program further includes instructions for performing at least the following:
adding the information to the change request form, by the Administrator; and
forwarding the change request form with the added information to the hand-held device, and wherein said receiving step comprises the step of receiving the information in the change request form.

23. The program storage device of claim 19, wherein the instructions for performing said transmitting step comprises instructions for automatically uploading the change request form to the network when the hand-held device is synced with the network.

24. The program storage device of claim 19, wherein the application program further includes instructions for displaying an annotations menu for allowing the user to annotate the document to identify the user-identified potential error.

25. The program storage device of claim 19, wherein the application program further includes instructions for displaying a change request text selection dialog box for allowing the user to enter text corresponding to the user-identified potential error for inclusion in the change request form.

26. The program storage device of claim 19, wherein the instructions for performing said generating step comprises instructions for displaying the change request form to the user to allow the user to specify the user-identified potential error thereon.

27. The program storage device of claim 26, wherein the instructions for performing said generating step comprises instructions for performing at least the following:
receiving a handwritten user input on the change request form that specifies the user-identified potential error in the document;
decoding the user input using handwriting recognition; and
including the decoded user input in the change request form prior to said transmitting step.

28. The program storage device of claim 19, wherein the application program further includes instructions for performing at least the following:
displaying the document, from within a software application, for viewing by a user; and
providing, by the software application while displaying the document, a mechanism allowing the user to request the change request form,
wherein generating the change request form comprises generating the change request form in response to the user using the mechanism to request the change request form.

29. The program storage device of claim 19, wherein the change request form further specifies a severity level of the user-identified potential error.

30. An error notification method for a hand-held device that is capable of syncing with a network, comprising the steps of:
  generating a change request form that specifies a user-identified potential error in a document that is being displayed on the hand-held device;
  transmitting the change request form to an Administrator of the document;
  receiving information from the Administrator regarding the user-identified potential error; and
  displaying the information to the user.

31. The error notification method of claim 30, wherein the change request form further specifies at least one of a severity level of the user-identified potential error, a title of the user-identified potential error, and a description of the user-identified potential error.

32. The error notification method of claim 30, further comprising the steps of:
  adding the information to the change request form, by the Administrator; and
  forwarding the change request form with the added information to the hand-held device, and wherein said receiving step comprises the step of receiving the information in the change request form.

33. The error notification method of claim 30, wherein said transmitting step comprises the step of automatically uploading the change request form to the network when the hand-held device is synced with the network.

34. The error notification method of claim 30, further comprising the step of displaying an annotations menu for allowing the user to annotate the document to identify the user-identified potential error.

35. The error notification method of claim 30, further comprising the step of displaying a change request text selection dialog box for allowing the user to enter text corresponding to the user-identified potential error for inclusion in the change request form.

36. The error notification method of claim 30, wherein said generating step comprises the step of displaying the change request form to the user to allow the user to specify the user-identified potential error thereon.

37. The error notification method of claim 36, wherein said generating step further comprises the steps of:
  receiving a handwritten user input on the change request form that specifies the user-identified potential error in the document;
  decoding the user input using handwriting recognition; and
  including the decoded user input in the change request form prior to said transmitting step.

38. The error notification method of claim 30, further comprising the steps of:
  displaying the document, from within a software application, for viewing by a user; and
  providing, by the software application while displaying the document, a mechanism allowing the user to request the change request form,
  wherein generating the change request form comprises generating the change request form in response to the user using the mechanism to request the change request form.

39. An error notification method for a hand-held device that is capable of syncing with a network, comprising the steps of:
  generating a change request form that specifies a user-identified potential error in a document that is being displayed on the hand-held device, wherein said change request form specifies the user-identified potential error using a pointer to an entity other than the change request form, the entity for at least one of annotating and identifying the error;
  associating the pointer with the change request form; and
  transmitting the change request form to an Administrator of the document.

40. The error notification method of claim 39, wherein the change request form further specifies at least one of a severity level of the user-identified potential error, a title of the user-identified potential error, and a description of the user-identified potential error.

41. The error notification method of claim 39, further comprising the steps of:
  receiving information from the Administrator regarding the user-identified potential error; and
  displaying the information to the user.

42. The error notification method of claim 41, further comprising the steps of:
  adding the information to the change request form, by the Administrator; and
  forwarding the change request form with the added information to the hand-held device, and wherein said receiving step comprises the step of receiving the information in the change request form.

43. The error notification method of claim 39, wherein said transmitting step comprises the step of automatically uploading the change request form to the network when the hand-held device is synced with the network.

44. The error notification method of claim 39, further comprising the step of displaying an annotations menu for allowing the user to annotate the document to identify the user-identified potential error.

45. The error notification method of claim 39, further comprising the step of displaying a change request text selection dialog box for allowing the user to enter text corresponding to the user-identified potential error for inclusion in the change request form.

46. The error notification method of claim 39, wherein said generating step comprises the step of displaying the change request form to the user to allow the user to specify the user-identified potential error thereon.

47. The error notification method of claim 46, wherein said generating step further comprises the steps of:
  receiving a handwritten user input on the change request form that specifies the user-identified potential error in the document;
  decoding the user input using handwriting recognition; and
  including the decoded user input in the change request form prior to said transmitting step.

48. The error notification method of claim 39, further comprising the steps of:
  displaying the document, from within a software application, for viewing by a user; and
  providing, by the software application while displaying the document, a mechanism allowing the user to request the change request form,
  wherein generating the change request form comprises generating the change request form in response to the user using the mechanism to request the change request form.

49. An error notification apparatus for a hand-held device that is capable of syncing with a network, comprising:
- a change request manager for generating a change request form that specifies a user-identified potential error in a document that is being displayed on the hand-held device;
- a modem for transmitting the change request form to an Administrator of the document, wherein the modem receives information from the Administrator regarding the user-identified potential error; and
- a display for displaying the information to the user.

50. The error notification apparatus of claim 49, wherein the change request form further specifies at least one of a severity level of the user-identified potential error, a title of the user-identified potential error, and a description of the user-identified potential error.

51. The error notification apparatus of claim 49, further comprising a display for displaying an annotations menu for allowing the user to annotate the document to identify the user-identified potential error.

52. The error notification apparatus of claim 49, further comprising a display for displaying a change request text selection dialog box for allowing the user to enter text corresponding to the user-identified potential error for inclusion in the change request form.

53. The error notification apparatus of claim 49, further comprising a display adapted to display the change request form to the user to allow the user to specify the user-identified potential error thereon.

54. The error notification apparatus of claim 53, wherein said display is further adapted to receive a handwritten user input on the change request form that specifies the user-identified potential error in the document, said method further comprises a handwriting recognition module for decoding the user input, and wherein said change request manager includes the decoded user input in the change request form prior to the change request form being transmitted by said modem.

55. The error notification apparatus of claim 49, wherein said change request form specifies the user-identified potential error using a pointer to an entity other than the change request form, the entity for at least one of annotating and identifying the error, and said pointer is associated with the change request form.

56. An error notification apparatus for a hand-held device that is capable of syncing with a network, comprising:
- a change request manager for generating a change request form that specifies a user-identified potential error in a document that is being displayed on the hand-held device; and
- a modem for transmitting the change request form to an Administrator of the document, wherein said modem automatically uploads the change request form to the network when the hand-held device is synced with the network,
- wherein the modem receives information from the Administrator regarding the user-identified potential error, and the apparatus further comprises a display for displaying the information to the user.

57. The error notification apparatus of claim 56, wherein the change request form further specifies at least one of a severity level of the user-identified potential error, a title of the user-identified potential error, and a description of the user-identified potential error.

58. The error notification apparatus of claim 56, further comprising a display for displaying an annotations menu for allowing the user to annotate the document to identify the user-identified potential error.

59. The error notification apparatus of claim 56, further comprising a display for displaying a change request text selection dialog box for allowing the user to enter text corresponding to the user-identified potential error for inclusion in the change request form.

60. The error notification apparatus of claim 56, further comprising a display adapted to display the change request form to the user to allow the user to specify the user-identified potential error thereon.

61. The error notification apparatus of claim 60, wherein said display is further adapted to receive a handwritten user input on the change request form that specifies the user-identified potential error in the document, said method further comprises a handwriting recognition module for decoding the user input, and wherein said change request manager includes the decoded user input in the change request form prior to the change request form being transmitted by said modem.

62. The error notification apparatus of claim 56, wherein said change request form specifies the user-identified potential error using a pointer to an entity other than the change request form, the entity for at least one of annotating and identifying the error, and said pointer is associated with the change request form.

63. An error notification apparatus for a hand-held device that is capable of syncing with a network, comprising:
- a change request manager for generating a change request form that specifies a user-identified potential error in a document that is being displayed on the hand-held device, wherein said change request form specifies the user-identified potential error using a pointer to an entity other than the change request form, the entity for at least one of annotating and identifying the error, and said pointer is associated with the change request form; and
- a modem for transmitting the change request form to an Administrator of the document.

64. The error notification apparatus of claim 63, wherein the change request form further specifies at least one of a severity level of the user-identified potential error, a title of the user-identified potential error, and a description of the user-identified potential error.

65. The error notification apparatus of claim 63, wherein said modem automatically uploads the change request form to the network when the hand-held device is synced with the network.

66. The error notification apparatus of claim 63, further comprising a display for displaying an annotations menu for allowing the user to annotate the document to identify the user-identified potential error.

67. The error notification apparatus of claim 63, further comprising a display for displaying a change request text selection dialog box for allowing the user to enter text corresponding to the user-identified potential error for inclusion in the change request form.

68. The error notification apparatus of claim 63, further comprising a display adapted to display the change request form to the user to allow the user to specify the user-identified potential error thereon.

69. The error notification apparatus of claim 68, wherein said display is further adapted to receive a handwritten user input on the change request form that specifies the user-identified potential error in the document, said method further comprises a handwriting recognition module for decoding the user input, and wherein said change request manager includes the decoded user input in the change request form prior to the change request form being transmitted by said modem.

70. An error notification method for a hand-held device that is capable of syncing with a network, comprising the steps of:
   generating a change request form that specifies a user-identified potential error in a document that is being displayed on the hand-held device; and
   transmitting the change request form to an Administrator of the document,
   wherein the change request form further specifies a severity level of the user-identified potential error, and
   wherein said change request form specifies the user-identified potential error using a pointer to an entity other than the change request form, the entity for at least one of annotating and identifying the error, and said method further comprises the step of associating the pointer with the change request form.

71. An error notification apparatus for a hand-held device that is capable of syncing with a network, comprising:
   a change request manager for generating a change request form that specifies a user-identified potential error in a document that is being displayed on the hand-held device; and
   a modem for transmitting the change request form to an Administrator of the document,
   wherein the change request form further specifies a severity level of the user-identified potential error, and
   wherein the modem receives information from the Administrator regarding the user-identified potential error, and the apparatus further comprises a display for displaying the information to the user.

72. A program storage device having an application program tangibly embodied thereon, the application program including instructions for performing at least the following:
   providing a change request form that allows a user to specify a potential error in a document that is being displayed on a hand-held device;
   sending the change request form to an administrator of the document;
   receiving information from the administrator regarding the user-identified potential error; and
   displaying the information to the user.

73. The program storage device of claim 72, wherein the application program further includes instructions for performing at least the following:
   adding the information to the change request form, by the administrator; and
   forwarding the change request form with the added information to the hand-held device, and wherein said receiving step comprises the step of receiving the information in the change request form.

* * * * *